United States Patent
Nakamura et al.

(10) Patent No.: US 8,812,010 B2
(45) Date of Patent: Aug. 19, 2014

(54) RADIO COMMUNICATION SYSTEM, RADIO BASE STATION, AND COMMUNICATION CONTROL METHOD

(75) Inventors: Kazutaka Nakamura, Yokohama (JP); Chiharu Yamazaki, Tokyo (JP); Taku Nakayama, Yamato (JP); Shingo Joko, Kawasaki (JP); Yoshimasa Kusano, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 61 days.

(21) Appl. No.: 13/700,126

(22) PCT Filed: May 27, 2011

(86) PCT No.: PCT/JP2011/062277
§ 371 (c)(1),
(2), (4) Date: Nov. 26, 2012

(87) PCT Pub. No.: WO2011/149082
PCT Pub. Date: Dec. 1, 2011

(65) Prior Publication Data
US 2013/0072202 A1   Mar. 21, 2013

(30) Foreign Application Priority Data
May 27, 2010  (JP) ................................ 2010-122142

(51) Int. Cl.
*H04W 72/00* (2009.01)
*H04W 72/04* (2009.01)
*H04W 16/08* (2009.01)
*H04W 28/08* (2009.01)

(52) U.S. Cl.
CPC ...... *H04W 72/0426* (2013.01); *H04W 72/0406* (2013.01); *H04W 16/08* (2013.01); *H04W 28/08* (2013.01); *H04W 72/04* (2013.01)
USPC .......... 455/453; 455/445; 455/446; 455/448; 455/450; 370/331; 370/350

(58) Field of Classification Search
CPC ..... H04W 28/08; H04W 72/04; H04W 16/08; H04W 72/0406
USPC ................. 455/453, 445, 446, 448, 450, 436; 370/331, 350
See application file for complete search history.

(56) References Cited

U.S. PATENT DOCUMENTS

2008/0165727 A1* 7/2008 Xiaoben et al. ............... 370/329
2013/0072212 A1* 3/2013 Nakamura et al. ......... 455/452.1

OTHER PUBLICATIONS

3GPP TR 36.902 V9.1.0 (Mar. 2010); 3rd Generation Partnership Project; Technical Specification Group Radio Access Network; Evolved Universal Terrestrial Radio Access Network (E-UTRAN); Self-configuring and self-optimizing network (SON) use cases and solutions (Release 9).
International Search Report; PCT/JP2011/062277; Jul. 26, 2011.

* cited by examiner

*Primary Examiner* — Khalid Shaheed
(74) *Attorney, Agent, or Firm* — Studebaker & Brackett PC

(57) ABSTRACT

A radio base station (eNB10-1) transmits a Resource Status Update message including first load information indicating the load level thereof to a radio base station (eNB10-2) when the load level thereof is less than a first threshold, and omits the transmission of the Resource Status Update message including the first load information when the load level thereof is the first threshold or more.

8 Claims, 7 Drawing Sheets

RADIO COMMUNICATION SYSTEM, RADIO BASE STATION, AND COMMUNICATION CONTROL METHOD

TECHNICAL FIELD

The present invention relates to a radio communication technique, and particularly to a radio communication system, a radio base station, and a communication control method which are capable of coverage adjustment.

BACKGROUND ART

In LTE (Long Term Evolution) standardized by 3GPP (3rd Generation Partnership Project) which is a standardized organization for radio communication systems, a technique called SON (Self Organizing Network) is employed. According to SON, it is expected that for installation and maintenance of a radio base station, measurement and setting in the field can be automated without needing human intervention (see, for example, Non-patent Literature 1).

In SON, the following method for coverage adjustment is proposed. Specifically, to balance the load between radio base stations (called eNBs in 3GPP), coverage adjustment is made based on load information exchanged between the radio base stations. Such an optimization technique is called MLB (Mobility Load Balancing).

To be more specific, the following pieces of load information are defined in the LTE system: (a) PRB (Physical Resource Blocks) usage (PRB is a unit of time-frequency resource allocation), (b) load on a backhaul between a radio base station and a core network, (c) hardware load on the radio base station, and (d) a capacity class, which is an indicator of the relative communication capacity of the radio base station, and a percentage of communication capacity available in the communication capacity.

PRIOR ART DOCUMENT

Non-Patent Document

Non-patent Document 1: 3GPP TR 36.902 V9.1.0 March, 2010.

SUMMARY OF THE INVENTION

However, in this method of coverage adjustment based on load information, the load information is constantly exchanged between the radio base stations, and therefore a transmission path between the radio base stations which is the backhaul suffers increased load.

Accordingly, the present invention has an objective to provide a radio communication system, a radio base station, and a communication control method, with which load on a transmission path between the radio base stations can be reduced.

In order to solve the problem described above, the present invention has features below.

A feature of the present invention is summarized as follows. A radio communication system comprises a first radio base station (radio base station eNB10-1) and a second radio base station (radio base station eNB10-2) which are each capable of adjusting its coverage according to load on the radio base station itself and load on the other radio base station, wherein the first radio base station comprises: a load information transmission unit (X2 interface communication unit 140) configured to transmit, to the second radio base station, load information indicating a load level of the first radio base station; and a controller (transmission control unit 122) configured to control the load information transmission unit. When the load level of the first radio base station is below a first threshold, the controller controls the load information transmission unit so that the load information is transmitted to the second radio base station. When the load level of the first radio base station is at or above the first threshold, the controller controls the load information transmission unit so that transmission of the load information to the second radio base station is omitted. The second radio base station comprises a load information reception unit (X2 interface communication unit 240) configured to receive the load information from the first radio base station.

In such a radio communication system, the first radio base station transmits load information to the second radio base station when the load level of the first radio base station is below the first threshold, and omits transmission of the load information when the load level of the first radio base station is at or above the first threshold. The second radio base station needs the load information of the first radio base station when reducing its coverage. However, it is difficult to expand the coverage of the first radio base station when the load level of the first radio base station is high. Accordingly, transmission of the load information from the first radio base station to the second radio base station is unnecessary in view of the difficulty in expanding the coverage of the first radio base station. For this reason, in such a case, transmission of the load information is omitted to reduce the load on the transmission path between the radio base stations.

A feature of the present invention is summarized as follows. A radio communication system comprises a first radio base station (radio base station eNB10-1) and a second radio base station (radio base station eNB10-2) which are each capable of adjusting its coverage according to load on the radio base station itself and load on the other radio base station, wherein the second radio base station comprises a load request information transmission unit (X2 interface communication unit 240) configured to transmit load request information requesting load information indicating a load level of the first radio base station. The first radio base station comprises: a load request information reception unit (X2 interface communication unit 140) configured to receive the load request information from the second radio base station; a response information transmission unit (X2 interface communication unit 140) configured to transmit, to the other radio base station, response information as a response to the load request information; and a controller configured to control the transmission unit. When the load level of the first radio base station is below a first threshold, the controller controls the load information transmission unit so that the response information is transmitted to the second radio base station. When the load level of the first radio base station is at or above the first threshold, the controller controls the load information transmission unit so that transmission of the response information to the second radio base station is omitted.

In such a radio communication system, upon receipt of a request from the second radio base station for the load information, the first radio base station transmits response information as a response to the second radio base station when the load level of the first radio base station is below the first threshold, and omits transmission of the response information when the load level of the first radio base station is at or above the first threshold. The second radio base station needs the load information of the first radio base station when reducing its coverage. However, it is difficult to expand the coverage of the first radio base station when the load level of the first radio base station is high. Accordingly, transmission of the response information from the first radio base station to the second radio base station is unnecessary in view of the difficulty in expanding the coverage of the first radio base station. For this reason, in such a case, transmission of the response information is omitted to reduce the load on the transmission path between the radio base stations.

A feature of the present invention is summarized as follows. A radio base station (radio base station eNB10-1) capable of adjusting its coverage according to load on the radio base station and load on a different radio base station, comprises: a transmission unit (X2 interface communication unit 140) configured to transmit, to the different radio base station, load information indicating a load level of the radio base station; and a controller (transmission control unit 122) configured to control the transmission unit. When the load level of the radio base station is below a first threshold, the controller controls the transmission unit so that the load information is transmitted to the different radio base station. When the load level of the radio base station is at or above the first threshold, the controller controls the transmission unit so that transmission of the load information to the different radio base station is omitted.

A feature of the present invention is summarized as follows. A radio base station (radio base station eNB10-1) capable of adjusting its coverage according to load on the radio base station and load on a different radio base station, comprises: a reception unit (X2 interface communication unit 140) configured to receive load request information requesting load information indicating a load level of the radio base station, the load request information being transmitted from the different radio base station; a transmission unit (X2 interface communication unit 140) configured to transmit, to the different radio base station, response information as a response to the load request information; and a controller (transmission control unit 122) configured to control the transmission unit. When the load level of the radio base station is below a first threshold, the controller controls the transmission unit so that the response information is transmitted to the different radio base station. When the load level of the radio base station is at or above the first threshold, the controller controls the transmission unit so that transmission of the response information to the different radio base station is omitted.

A feature of the present invention is summarized as follows. When the load level of the radio base station reaches or exceeds a second threshold after the transmission of the load information, the transmission controller controls the transmission unit so that the transmission of the load information is stopped.

A feature of the present invention is summarized as follows. The second threshold is a value of a load level at which the radio base station is capable of operating stably.

A feature of the present invention is summarized as follows. When the load level of the radio base station reaches or exceeds a second threshold after the transmission of the load information, the transmission controller controls the transmission unit so that the transmission of the load information is stopped.

A feature of the present invention is summarized as follows. A communication control method for a radio base station capable of adjusting its coverage according to load on the radio base station and load on a different radio base station, comprises the steps of: transmitting, to the different radio base station, load information indicating a load level of the radio base station; and controlling transmission of the load information. In the step of controlling transmission of the load information, when the load level of the radio base station is below a first threshold, control is performed so that the load information is transmitted to the different radio base station, and when the load level of the radio base station is at or above the first threshold, control is performed so that transmission of the load information to the different radio base station is omitted.

A feature of the present invention is summarized as follows. A communication control method for a radio base station capable of adjusting its coverage according to load on the radio base station and load on a different radio base station, comprises the steps of: receiving load request information transmitted from the different radio base station, the load request information requesting load information indicating a load level of the radio base station; transmitting, to the different radio base station, response information as a response to the load request information; and controlling transmission of the response information. In the step of controlling transmission of the response information, when the load level of the radio base station is below a first threshold, control is performed so that the response information is transmitted to the different radio base station, and when the load level of the radio base station is at or above the first threshold, control is performed so that transmission of the response information to the different radio base station is omitted.

DESCRIPTION OF THE EMBODIMENTS

Figure 1:
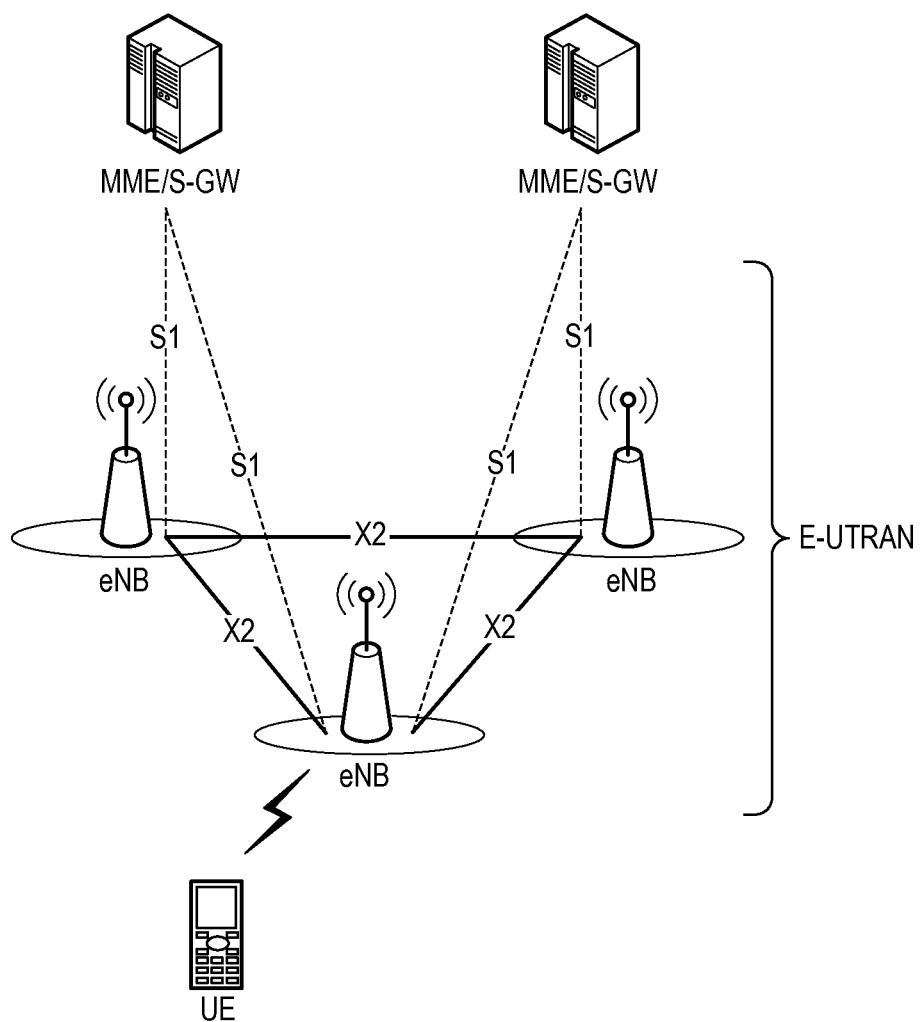
FIG. 1 is a diagram illustrating an overview of an LTE system according to an embodiment of the present invention.

An embodiment of the present invention is described next referring to the drawings. Specifically, descriptions are given of (1) Overview of the LTE System, (2) Configuration of the Radio Communication System, (3) Configuration of the First Radio Base Station, (4) Configuration of the Second Base Station, (5) Operations of the Radio Communication System, (6) Advantageous Effects, and (7) Other Embodiments. Throughout the drawings of the embodiment below, the same or similar parts are given the same or similar reference numerals.

(1) Overview of the LTE System

FIG. 1 is a diagram illustrating an overview of an LTE system. As shown in FIG. 1, multiple radio base stations eNB configure an E-UTRAN (Evolved-UMTS Terrestrial Radio Access Network). Each of the radio base stations eNB forms a cell in which a mobile terminal UE is to be provided with services.

The radio terminal UE is a radio communication device owned by a user, and is also called user equipment. The radio terminal UE measures the quality of radio signals received from the radio base stations eNB (i.e., radio quality), and sends the radio base station eNB to which the radio terminal UE is connected a report of radio quality measurement results (called a measurement result report below).

Examples of the radio quality include a reference signal received power (RSRP) and a signal to interference plus noise ratio (SINR). A measurement result report for RSRP is called a measurement report, and a measurement result report for an SINR index for each particular frequency band is called CQI (Channel Quality Indicator).

The radio base station eNB to which the radio terminal UE is connected performs handover control for switching the connection destination of the radio terminal UE, based on the measurement report received from the radio terminal UE. When the radio terminal UE receives reference signals from multiple radio base stations eNB, the measurement report includes multiple RSRPs of the respective radio base stations eNB. The radio base station eNB to which the radio terminal UE is connected selects the radio base station eNB having the highest RSRP of all the radio base stations eNB as a connection destination of the radio terminal UE.

Further, based on the CQI received from the radio terminal UE, the radio base station eNB to which the radio terminal UE is connected assigns the radio terminal UE a resource block which is a unit of radio resource allocation. Further, based on the CQI received from the radio terminal UE, the radio base station eNB to which the radio terminal UE is connected determines a modulation class used for radio communication with the ratio terminal UE. The modulation class is a combination of a modulation level and a code rate.

Each radio base station eNB can communicate with other radio base stations eNB via an X2 interface which is a logical communication path providing communication between the base stations. Each of the radio base stations eNB can communicate with an EPC (Evolved Packet Core), or specifically, an MME (Mobility Management Entity)/S-GW (Serving Gateway) via an S1 interface.

(2) Configuration of the Radio Communication System

Figure 2:
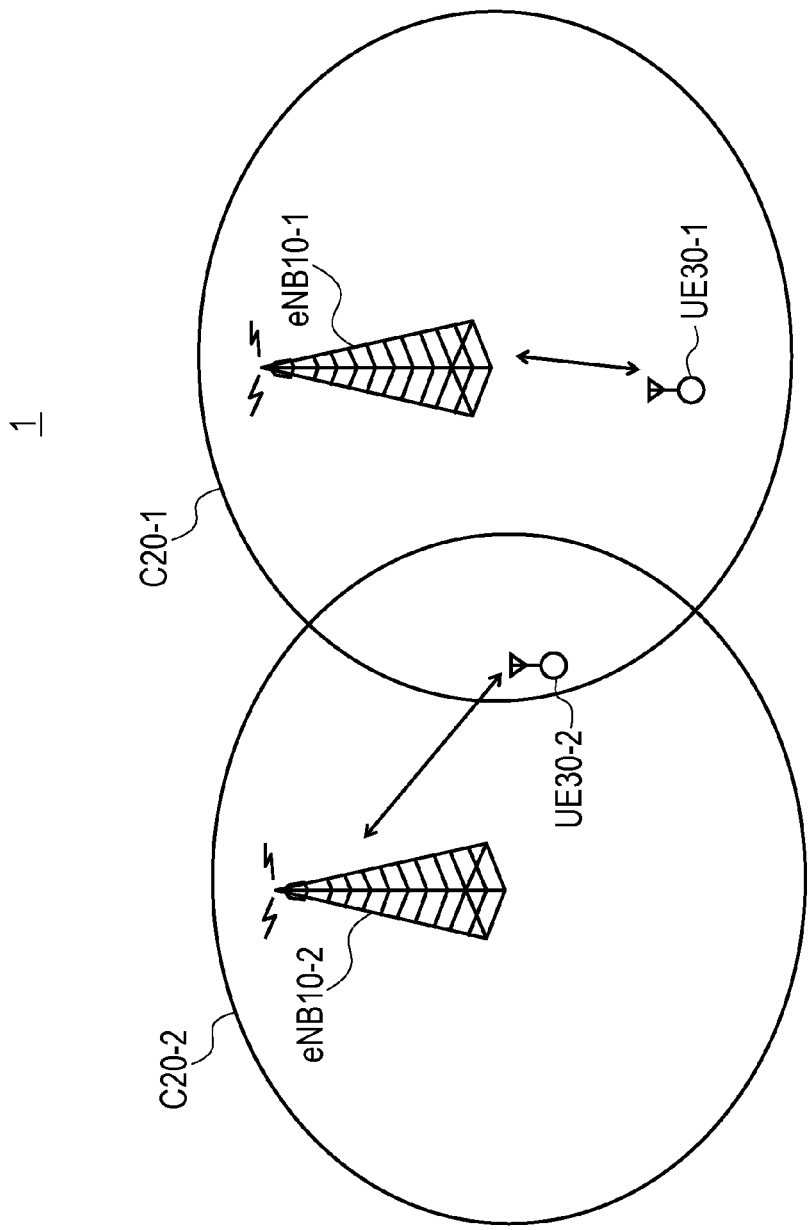
FIG. 2 is a diagram showing the schematic configuration of a radio communication system according to the embodiment of the present invention.

FIG. 2 is a diagram of the schematic configuration of a radio communication system 1 according to the present embodiment.

As shown in FIG. 2, the radio communication system 1 has a radio base station eNB10-1, a radio terminal UE30-1 connected to the radio base station eNB10-1 in a cell C20-1 formed by the radio base station eNB10-1, a radio base station eNB10-2, and a radio terminal UE30-2 connected to the radio base station eNB10-2 in a cell C20-2 formed by the radio base station eNB10-2. The radio base station eNB10-1 and the radio base station eNB10-2 can per form inter-base station communication using the X2 interface described above.

In the present embodiment, the radio base station eNB10-1 corresponds to a first radio base station, and the radio base station eNB10-2 corresponds to a second radio base station. Although FIG. 2 shows only one radio terminal UE30-1 and one radio terminal UE30-2, there are actually multiple radio terminals UE30-1 and multiple radio terminals UE30-2.

The radio communication system 1 supports MLB described earlier. In the present embodiment, based on load information exchanged between the radio base stations eNB, each radio base station eNB adjusts a handover parameter which is a base-station parameter for specifying coverage. For example, when the load on the radio base station eNB10-2 is higher than the load on the radio base station eNB10-1, the coverage of the radio base station eNB10-2 is decreased, and the coverage of the radio base station eNB10-1 is increased by adjusting the handover parameters.

In the present embodiment, such a handover parameter is an offset value for correcting an RSRP measured by the radio terminal UE. For example, when the radio terminal UE30-2 can receive radio signals from each of the radio base station eNB10-2 and the radio base station eNB10-1, before comparing the RSRP of the radio base station eNB10-1 (called RSRP 1 below) with the RSRP of the radio base station eNB10-2 (called RSRP 2 below), an offset value for increasing (correcting) RSRP 1 is added to RSRP 1. Thereby, offset RSRP 1 is highly likely to exceed RSRP 2. Thus, the radio base station eNB10-1 is preferentially selected as a connection destination (a handover target), and the coverage of the radio base station eNB10-1 can be expanded. To avoid unnecessary handover, a single offset value is prepared for paired radio base stations eNB, and shared between the paired radio base stations eNB.

(3) Configuration of the First Radio Base Station

Figure 3:
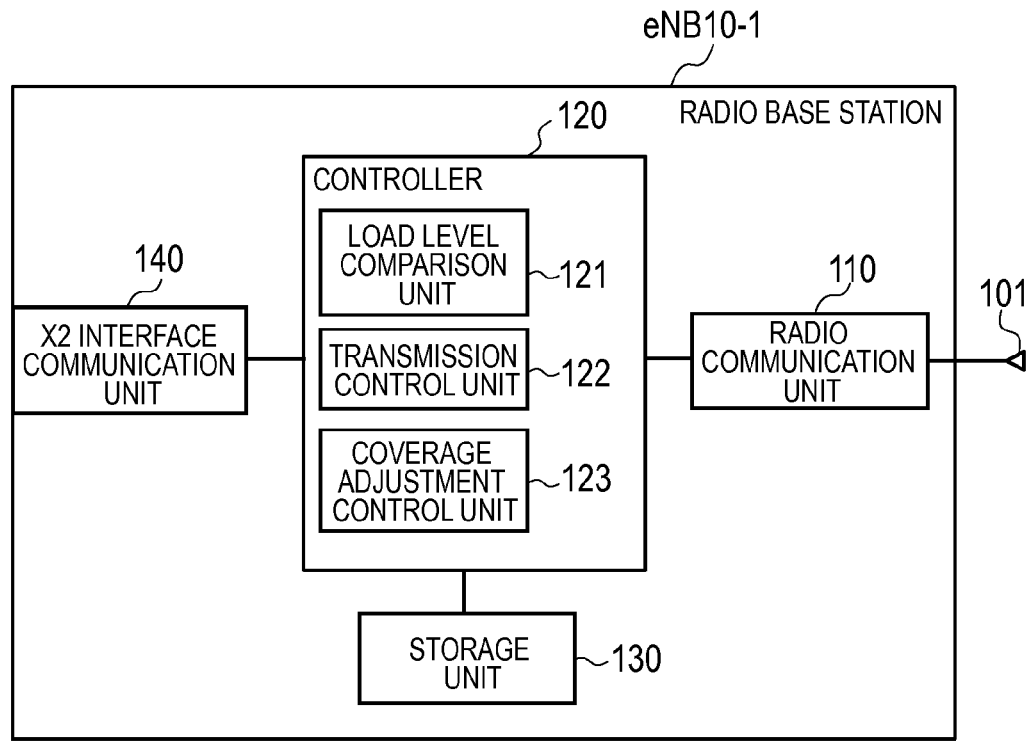
FIG. 3 is a block diagram showing the configuration of a first radio base station according to the embodiment of the present invention.

The configuration of the radio base station eNB10-1 is described next. FIG. 3 is a block diagram showing the configuration of the radio base station eNB10-1 according to the present embodiment.

As shown in FIG. 3, the radio base station eNB10-1 has an antenna unit 101, a radio communication unit 110, a controller 120, a storage unit 130, and an X2 interface communication unit 140.

The antenna unit 101 is used in sending and receiving radio signals. The radio communication 110 is configured with, for example, a radio frequency (RF) circuit, a baseband (BB) circuit, or the like, and is configured to send and receive radio signals to and from the radio terminal UE via the antenna unit 101. The radio communication unit 110 is also configured to modulate transmission signals and demodulate received signals.

The controller 120 is configured with, for example, a CPU, and is configured to control various functions of the radio base station eNB10-1. The storage unit 130 is configured with, for example, a memory, and is configured to store various pieces of information used in the control of the radio base station eNB10-1, or the like. The X2 interface communication unit 140 is configured to perform inter-base station communication with other radio base stations using the X2 interface.

The controller 120 has a load level comparison unit 121, a transmission control unit 122, and a coverage adjustment control unit 123.

In the radio base station eNB10-1, first processing and second processing described below are performed selectively.

(First Processing)

The load level comparison unit 121 is configured to measure the level of the load on its radio base station eNB10-1. Here, load information indicating the load level of the radio base station eNB10-1 (called first load information below) is (a) PRB (Physical Resource Blocks) usage (PRB is a unit of time-frequency resource allocation), (b) load on the X2 interface between the radio base station eNB10-1 and the core network, (c) hardware load on the radio base station eNB10-1, and (d) a capacity class, which is an indicator of the relative communication capacity of the radio base station eNB10-1, and a percentage of communication capacity available in the communication capacity.

The load level comparison unit 121 determines whether the measured load level of the radio base station eNB10-1 is below a first threshold or not. Here, the first threshold is prepared for each type of load levels, and stored in the storage unit 130. More specifically, the load level comparison unit 121 determines whether the load levels of all the types of the radio base station eNB10-1 are below their corresponding first thresholds or not, or determines whether the load level of one of the types of the radio base station eNB10-1 is below its corresponding first threshold or not.

When the load level of the radio base station eNB10-1 is below the first threshold, the coverage of the radio base station eNB10-1 is preferably expanded virtually in order to reduce the load on the neighboring radio base station eNB10-2. On the other hand, when the load level of the radio base station eNB10-1 is at or above the first threshold, the radio base station eNB10-1 cannot afford to further increase its load by expanding its coverage.

When the load level of the radio base station eNB10-1 is at or above the first threshold, the transmission control unit 122 controls the X2 interface communication unit 140 so that the X2 interface communication unit 140 omits transmission of a Resource Status Update message containing the first load information indicating the load level of the radio base station eNB10-1. Controlled by the transmission control unit 122, the X2 interface communication unit 140 omits (stops) transmission of the Resource Status Update message.

On the other hand, when the load level of the radio base station eNB10-1 is below the first threshold, the transmission control unit 122 outputs a Resource Status Update message containing the first load information indicating the load level of the radio base station eNB10-1 to the X2 interface communication unit 140. In addition, the transmission control unit 222 controls the X2 interface communication unit 140 so that the X2 interface communication unit 140 sends the radio base station eNB10-1 the Resource Status Update message containing the first load information.

Controlled by the transmission control unit 122, the X2 interface communication unit 140 sends the radio base station eNB10-2 the Resource Status Update message containing the first load information via the X2 interface.

After sending the Resource Status Update message containing the first load information, the X2 interface communication unit 140 receives a Mobility Change Request message containing an offset value as a handover parameter from the radio base station eNB10-2 via the X2 interface, and outputs the message to the coverage adjustment control unit 123.

The transmission control unit 122 outputs a Mobility Change Acknowledge message to the X2 interface communication unit 240 as a response to the Mobility Change Request message, and controls the X2 interface communication unit 140 so that the X2 interface communication unit 140 sends the radio base station eNB10-1 the Mobility Change Acknowledge message.

Controlled by the transmission control unit 122, the X2 interface communication unit 140 sends the radio base station eNB10-1 the Mobility Change Acknowledge message via the X2 interface.

The coverage adjustment control unit 123 sets an offset value as a handover parameter, which is included in the Mobility Change Request message. The offset value thus set is stored in the storage unit 130. Thus, the offset value as a handover parameter is shared between the radio base station eNB10-1 and the radio base station eNB10-2, and RSRP 1 to which the offset value is added and RSRP 2 are compared in performing handover control. As a result, the coverage of the radio base station eNB10-1 is expanded virtually.

After the transmission control unit 122 performs the control for transmission of the Resource Status Update message containing the first load information to the radio base station eNB10-2, the following processing is performed in parallel.

The load level comparison unit 121 measures the load level of its radio base station eNB10-1. The load level comparison unit 121 determines whether the measured load level of the radio base station eNB10-1 is at or above a second threshold or not. Here, the second threshold is larger than the first threshold, and is a value within the range of load levels at which the radio base station eNB10-1 can stably operate. Further, the second threshold is prepared for each type of the load levels, and stored in the storage unit 130. The load level comparison unit 121 determines whether the load levels of all the types of the radio base station eNB10-1 are at or above their corresponding second thresholds or not, or determines whether the load level of one of the types of the radio base station eNB10-1 is at or above its corresponding second threshold or not.

When the load level of the radio base station eNB10-1 is at or above the second threshold, the radio base station eNB10-1 cannot afford to further increase its load by expanding its coverage.

Accordingly, when the load level of the radio base station eNB10-1 is at or above the second threshold, the transmission control unit 122 controls the X2 interface communication unit 140 so that the X2 interface communication unit 140 stops transmission of the Resource Status Update message containing the first load information. Controlled by the transmission control unit 122, the X2 interface communication unit 140 stops transmission of the Resource Status Update message containing the first load information.

(Second Processing)

When the radio base station eNB10-2 sends the radio base station eNB10-1 a Resource Status Request message requesting the radio base station eNB10-1 to start transmission of the first load information, the following processing is performed.

The load level comparison unit 121 measures the load level of its radio base station eNB10-1. Then, upon receipt of the Resource Status Request message requesting to start transmission of the first load information from the radio base station eNB10-2 via the X2 interface, the X2 interface communication unit 140 outputs the Resource Status Request message to the load level comparison unit 121. Here, the Resource Status Request message requesting to start transmission of the first load information includes Registration Request being information requesting to start transmission of the first load information, Report Characteristics being information indicating the type of the first load information to be sent, and information indicating the transmission cycle of the first load information.

After receiving the Resource Status Request message requesting to start transmission of the first load information, the load level comparison unit 121 determines whether the load level of the radio base station eNB10-1 is below a fourth threshold or not. Here, the fourth threshold is equal to or smaller than the second threshold value. The fourth threshold is prepared for each type of the load levels, and stored in the storage unit 130. Further, the fourth threshold is a maximum value of all the values defined as load levels at which the radio base station eNB10-1 can stably operate. To be more specific, the load level comparison unit 121 determines whether the load levels of all the types of the radio base station eNB10-1 are below their corresponding fourth thresholds or not, or determines whether the load level of one of the types of the radio base station eNB10-1 is below its corresponding fourth threshold or not.

When the load level of the radio base station eNB10-1 is at or above the fourth threshold, the transmission control unit 122 controls the X2 interface communication unit 140 so that the X2 interface communication unit 140 omits transmission of a Resource Status Response message as a response to the Resource Status Request message. Controlled by the transmission control unit 122, the X2 interface communication unit 140 omits (stops) transmission of the Resource Status Response message.

On the other hand, when the load level of the radio base station eNB10-1 is below the fourth threshold, the transmission control unit 122 outputs a Resource Status Response message to the X2 interface communication unit 140 as a response. Further, the transmission control unit 122 controls the X2 interface communication unit 140 so that the X2 interface communication unit 140 sends the radio base station eNB10-1 the Resource Status Response message.

Controlled by the transmission control unit 122, the X2 interface communication unit 140 sends the radio base station eNB10-2 the Resource Status Response via the X2 interface.

Then, the load level comparison unit 121 measures the load level of its radio base station eNB10-1.

The transmission control unit 122 outputs a Resource Status Update message containing the first load information indicating the measured load level of the radio base station eNB10-1 to the X2 interface communication unit 140. Further, the transmission control unit 122 controls the X2 interface communication unit 140 so that the X2 interface communication unit 140 sends the radio base station eNB10-2 the Resource Status Update message containing the first load information. Here, the transmission control unit 122 includes, in the Resource Status Update message, the first load information having the type corresponding to Report Characteristics included in the Resource Status Request message requesting to start transmission of the first load information, and outputs the Resource Status Update message to the X2 interface communication unit 140 at a transmission cycle included in the Resource Status Request message requesting to start transmission of the first load information.

Controlled by the transmission control unit 122, the X2 interface communication unit 140 sends the radio base station eNB10-2 the Resource Status Update message containing the first load information via the X2 interface.

Then, as in the first processing, the X2 interface communication unit 140 receives a Mobility Change Request message containing an offset value as a handover parameter via the X2 interface, and outputs the Mobility Change Request message to the coverage adjustment control unit 123.

The transmission control unit 122 outputs a Mobility Change Acknowledge message to the X2 interface communication unit 240 as a response to the Mobility Change Request message, and controls the X2 interface communication unit 140 so that the X2 interface communication unit 140 sends the radio base station eNB10-2 the Mobility Change Acknowledge message.

Controlled by the transmission control unit 122, the X2 interface communication unit 140 sends the radio base station eNB10-2 the Mobility Change Acknowledge message via the X2 interface.

The coverage adjustment control unit 123 sets the offset value as a handover parameter included in the Mobility Change Request message. The offset value thus set is stored in the storage unit 130. Thus, the offset value as a handover parameter is shared between the radio base station eNB10-1 and the radio base station eNB10-2, and in performing handover control, RSRP 1 to which the offset value is added and RSRP 2 are compared to each other. As a result, the coverage of the radio base station eNB10-1 is expanded virtually.

(4) Configuration of the Second Radio Base Station

Figure 4:
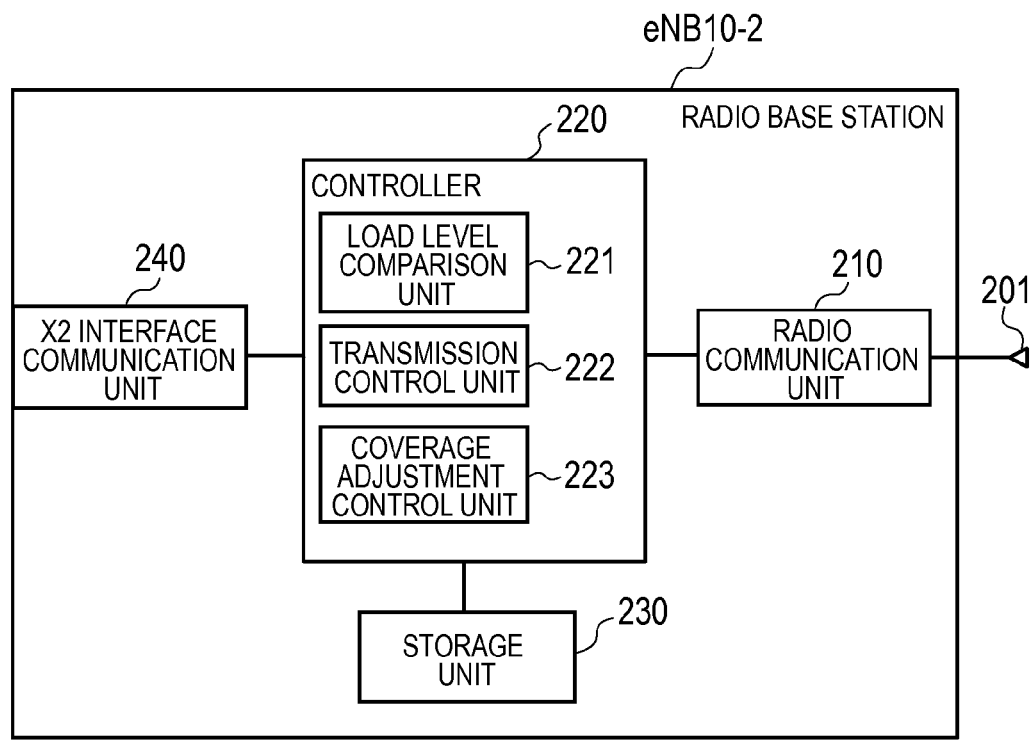
FIG. 4 is a block diagram showing the configuration of a second radio base station according to the embodiment of the present invention.

The configuration of the radio base station eNB10-2 is described next. FIG. 4 is a block diagram showing the configuration of the radio base station eNB10-2 according to the present embodiment.

As shown in FIG. 4, the radio base station eNB10-2 has an antenna unit 201, a radio communication unit 210, a controller 220, a storage unit 230, and an X2 interface communication unit 240.

The antenna unit 101 is used in sending and receiving radio signals. The radio communication 210 is configured with, for example, a radio frequency (RF) circuit, a baseband (BB) circuit, or the like, and is configured to send and receive radio signals to and from the radio terminal UE via the antenna unit 201. The radio communication unit 210 is also configured to modulate transmission signals and demodulate received signals.

The controller 220 is configured with, for example, a CPU, and is configured to control various functions of the radio base station eNB10-2. The storage unit 230 is configured with, for example, a memory, and is configured to store various pieces of information used in the control of the radio base station eNB10-2, or the like. The X2 interface communication unit 240 is configured to perform inter-base communication with other radio base stations using the X2 interface.

The controller 220 has a load level comparison unit 221, a transmission control unit 222, and a coverage adjustment control unit 223.

In the radio base station eNB10-2, third processing and fourth processing described below are performed selectively. The third processing is performed by the radio base station eNB10-2 when the radio base station eNB10-1 performs the first processing described above, and the fourth processing is performed by the radio base station eNB10-2 when the radio base station eNB10-1 performs the second processing described above.

(Third Processing)

The X2 interface communication unit 240 periodically receives the Resource Status Update message containing the first load information from the radio base station eNB10-1 via the X2 interface, and outputs the Resource Status Update message to the load level comparison unit 221.

After receiving the Resource Status Response message, the load level comparison unit 221 measures the load level of its radio base station eNB10-2. Here, load information indicating the load level of the radio base station eNB10-2 (called second load information below) is (a) PRB (Physical Resource Blocks) usage (PRB is a unit of time-frequency resources allocation), (b) load on the X2 interface between the radio base station eNB10-1 and the core network, (c) hardware load on the radio base station eNB10-1, and (d) a capacity class, which is an indicator of the relative communication capacity of the radio base station, and a percentage of communication capacity available in the communication capacity.

The load level comparison unit 221 determines whether the load level of the radio base station eNB10-1 is below the load level of the radio base station eNB10-2 or not every time the Resource Status Update message containing the first load information is inputted.

When the load level of the radio base station eNB10-1 is below the load level of the radio base station eNB10-2, the coverage adjustment control unit 223 determines an offset value as a handover parameter, which is to be added to RSRP 1. Here, the offset value is a positive value.

The transmission control unit 222 outputs a Mobility Change Request message containing the offset value to the X2 interface communication unit 240. Further, the transmission control unit 222 controls the X2 interface communication unit 240 so that the X2 interface communication unit 240 sends the radio base station eNB10-1 the Mobility Change Request message containing the offset value.

Controlled by the transmission control unit 222, the X2 interface communication unit 240 sends the radio base station eNB10-1 the Mobility Change Request message containing the offset value via the X2 interface.

Then, the X2 interface communication unit 240 receives a Mobility Change Acknowledge message from the radio base station eNB10-1 via the X2 interface, and outputs the Mobility Change Acknowledge message to the coverage adjustment control unit 223. Upon receipt of the Mobility Change Acknowledge message, the coverage adjustment control unit 223 sets the offset value as a handover parameter. The offset value thus set is stored in the storage unit 230.

(Fourth Processing)

The load level comparison unit 221 measures the load level of its radio base station eNB10-2. The load level comparison unit 221 determines whether the measured load level of the radio base station eNB10-2 is at or above a third threshold or not. Here, the third threshold is either a maximum value of all the values defined as load levels at which the radio base station eNB10-2 can stably operate, or a value smaller than the maximum value. To be more specific, the load level comparison unit 221 determines whether the load levels of all the types of the radio base station eNB10-2 are below their corresponding third thresholds or not, or determines whether the load level of one of the types of the radio base station eNB10-2 is below its corresponding third threshold or not.

When the load level of the radio base station eNB10-2 is at or above the third threshold, the coverage of the radio base station eNB10-1 is preferably expanded virtually in order to reduce the load on the radio base station eNB10-2. On the other hand, when the load level of the radio base station eNB10-2 is below the third threshold, the load on the radio base station eNB10-2 does not need to be reduced. Accordingly, the coverage of the radio base station eNB10-1 does not have to be virtually expanded.

When the load level of the radio base station eNB10-2 is at or above the third threshold, the transmission control unit 222 outputs, to the X2 interface communication unit 240, a Resource Status Request message requesting to start transmission of load information indicating the load level of the radio base station eNB10-1 (first load information). Further, the transmission control unit 222 controls the X2 interface communication unit 240 so that the X2 interface communication unit 240 sends the radio base station eNB10-1 a Resource Status Request message requesting to start transmission of the first load information.

Controlled by the transmission control unit 222, the X2 interface communication unit 240 sends the radio base station eNB10-1 the Resource Status Request message requesting to start transmission of the first load information via the X2 interface.

Then, the X2 interface communication unit 240 receives a Resource Status Response message from the radio base station eNB10-1 via the X2 interface, and outputs the Resource Status Response message to the load level comparison unit 221. Further, the X2 interface communication unit 240 periodically receives a Resource Status Update message containing the first load information from the radio base station eNB10-1 via the X2 interface, and outputs the Resource Status Update message to the load level comparison unit 221.

After receiving the Resource Status Response message, the load level comparison unit 221 measures the load level of its radio base station eNB10-2. Further, the load level comparison unit 221 determines whether the load level of the radio base station eNB10-1 is below the load level of the radio base station eNB10-2 or not every time the Resource Status Update message containing the first load information is inputted.

When the load level of the radio base station eNB10-1 is below the load level of the radio base station eNB10-2, the coverage adjustment control unit 223 determines an offset value as a handover parameter, which is to be added to RSRP 1. Here, the offset value is a positive value.

The transmission control unit 222 outputs a Mobility Change Request message containing the offset value to the X2 interface communication unit 240. Further, the transmission control unit 222 controls the X2 interface communication unit 240 so that the X2 interface communication unit 240 sends the radio base station eNB10-1 the Mobility Change Request message containing the offset value.

Controlled by the transmission control unit 222, the X2 interface communication unit 240 sends the radio base station eNB10-1 the Mobility Change Request message containing the offset value via the X2 interface.

Then, the X2 interface communication unit 240 receives a Mobility Change Acknowledge message from the radio base station eNB10-1 via the X2 interface, and outputs the Mobility Change Acknowledge message to the coverage adjustment control unit 223. Upon receipt of the Mobility Change Acknowledge message, the coverage adjustment control unit 223 sets the offset value as a handover parameter. The offset value thus set is stored in the storage unit 230.

(5) Operations of the Radio Communication System

Figure 5:
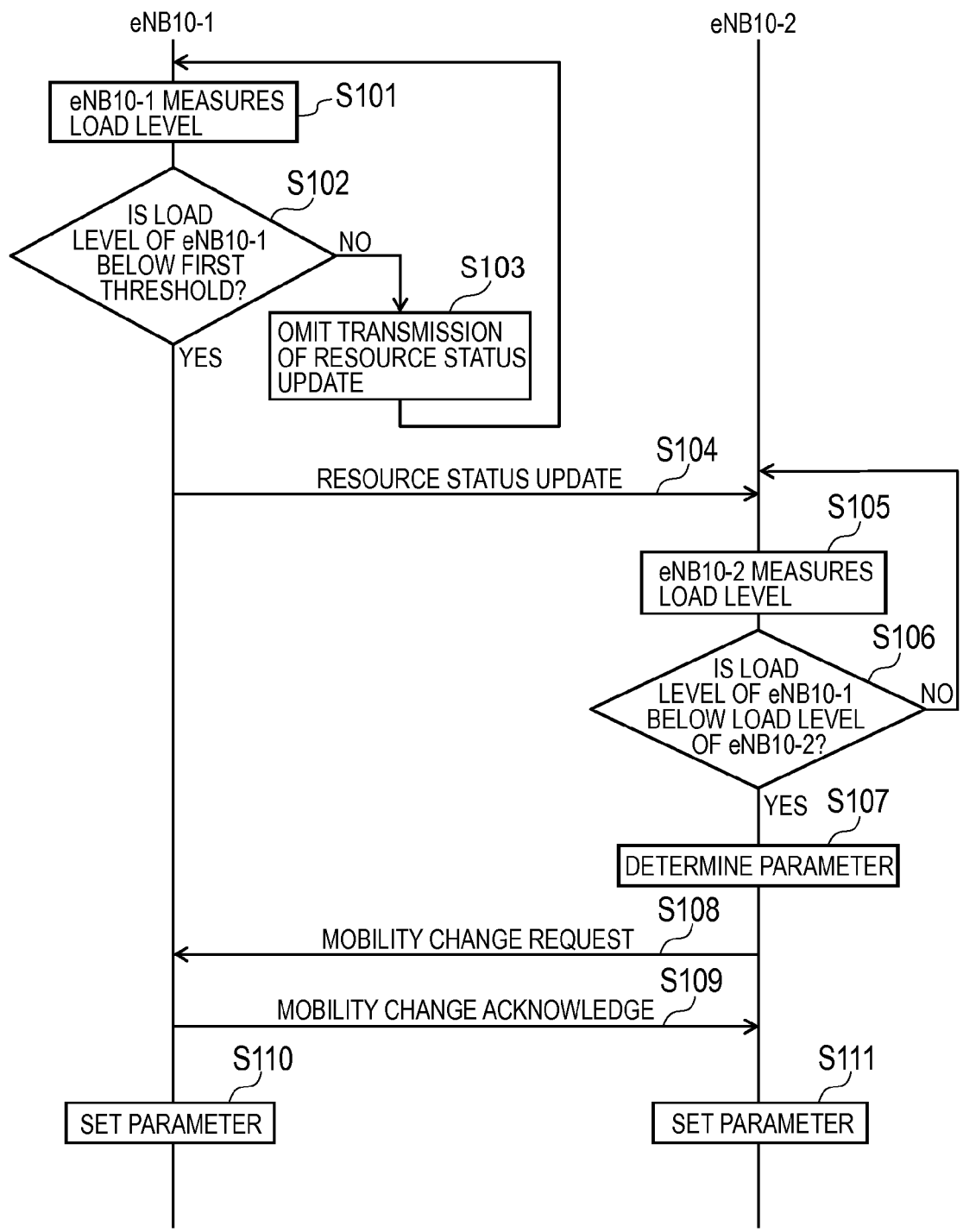
FIG. 5 is an operation sequence diagram showing first operations of the radio communication system according to the embodiment of the present invention.

FIG. 5 is an operation sequence diagram showing first operations of the radio communication system 1 according to the present embodiment.

In Step S101, the load level comparison unit 121 of the radio base station eNB10-1 measures the load level of the radio base station eNB10-1. In Step S102, the load level comparison unit 121 of the radio base station eNB10-1 determines whether the load level of the radio base station eNB10-1 is below the first threshold or not.

When the load level of the radio base station eNB10-1 is at or above the first threshold, in Step S103, the transmission control unit 122 of the radio base station eNB10-1 controls the X2 interface communication unit 140, and controlled by the transmission control unit 122, the X2 interface communication unit 140 omits (stops) transmission of a Resource Status Update message.

On the other hand, when the load level of the radio base station eNB10-1 is below the first threshold, in Step S104, the transmission control unit 122 of the radio base station eNB10-1 controls the X2 interface communication unit 140, and the X2 interface communication unit 140 sends the radio base station eNB10-2 a Resource Status Update message containing the first load information. The X2 interface communication unit 240 of the radio base station eNB10-2 receives the Resource Status Update message containing the first load information.

In Step S105, the load level comparison unit 221 of the radio base station eNB10-2 measures the load level of the radio base station eNB10-2. In Step S106, the load level comparison unit 221 of the radio base station eNB10-2 determines whether the load level of the radio base station eNB10-1 is below the load level of the radio base station eNB10-2 or not.

When the load level of the radio base station eNB10-1 is equal to or above the load level of the radio base station eNB10-2, the operations after Step S104 of receiving the Resource Status Update message containing the first load information are repeated.

On the other hand, when the load level of the radio base station eNB10-1 is below the load level of the radio base station eNB10-2, in Step S107, the coverage adjustment control unit 223 of the radio base station eNB10-2 determines an offset value as a handover parameter, which is added to RSRP 1.

In Step S108, the transmission control unit 222 of the radio base station eNB10-2 controls the X2 interface communication unit 240, and the X2 interface communication unit 240 sends the radio base station eNB10-1 a Mobility Change Request message containing the offset value. The X2 interface communication unit 140 of the radio base station eNB10-1 receives the Mobility Change Request message containing the offset value.

In Step S109, the transmission control unit 122 of the radio base station eNB10-1 controls the X2 interface communication unit 140, and the X2 interface communication unit 140 sends the radio base station eNB10-2 a Mobility Change Acknowledge message. The X2 interface communication unit 240 of the radio base station eNB10-2 receives the Mobility Change Acknowledge message.

In Step S110, the coverage adjustment control unit 123 of the radio base station eNB10-1 sets the offset value as a handover parameter, which is included in the Mobility Change Request. In Step S111, the coverage adjustment control unit 223 of the radio base station eNB10-2 sets the offset value as a handover parameter, which is determined in Step S107.

Figure 6:
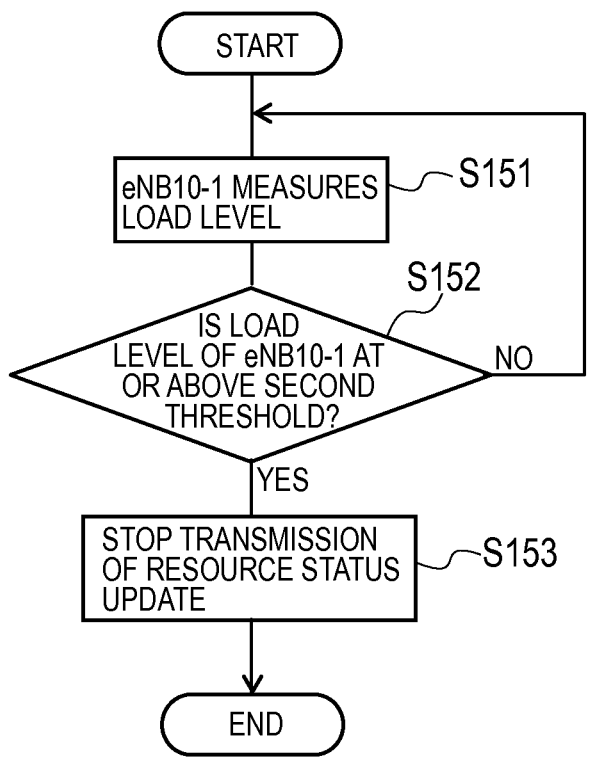
FIG. 6 is a flowchart showing the operations of the first radio base station according to the embodiment of the present invention.

FIG. 6 is a flowchart showing the operations of the radio base station eNB10-1 according to the present embodiment. The operations shown in FIG. 6 are performed in parallel with the first operations after the operation in Step S104 in the first operations shown in FIG. 5.

In Step S151, the load level comparison unit 121 of the radio base station eNB10-1 measures the load level of the radio base station eNB10-1.

In Step S152, the load level comparison unit 121 of the radio base station eNB10-1 determines whether the load level of the radio base station eNB10-1 is at or above the second threshold or not. When the load level of the radio base station eNB10-1 is below the second threshold, the operations after Step S151 are repeated.

On the other hand, when the load level of the radio base station eNB10-1 is at or above the second threshold, the transmission control unit 122 of the radio base station eNB10-1 controls the X2 interface communication unit 140, and the X2 interface communication unit 140 stops transmission of the Resource Status Update message containing the first load information.

Figure 7:
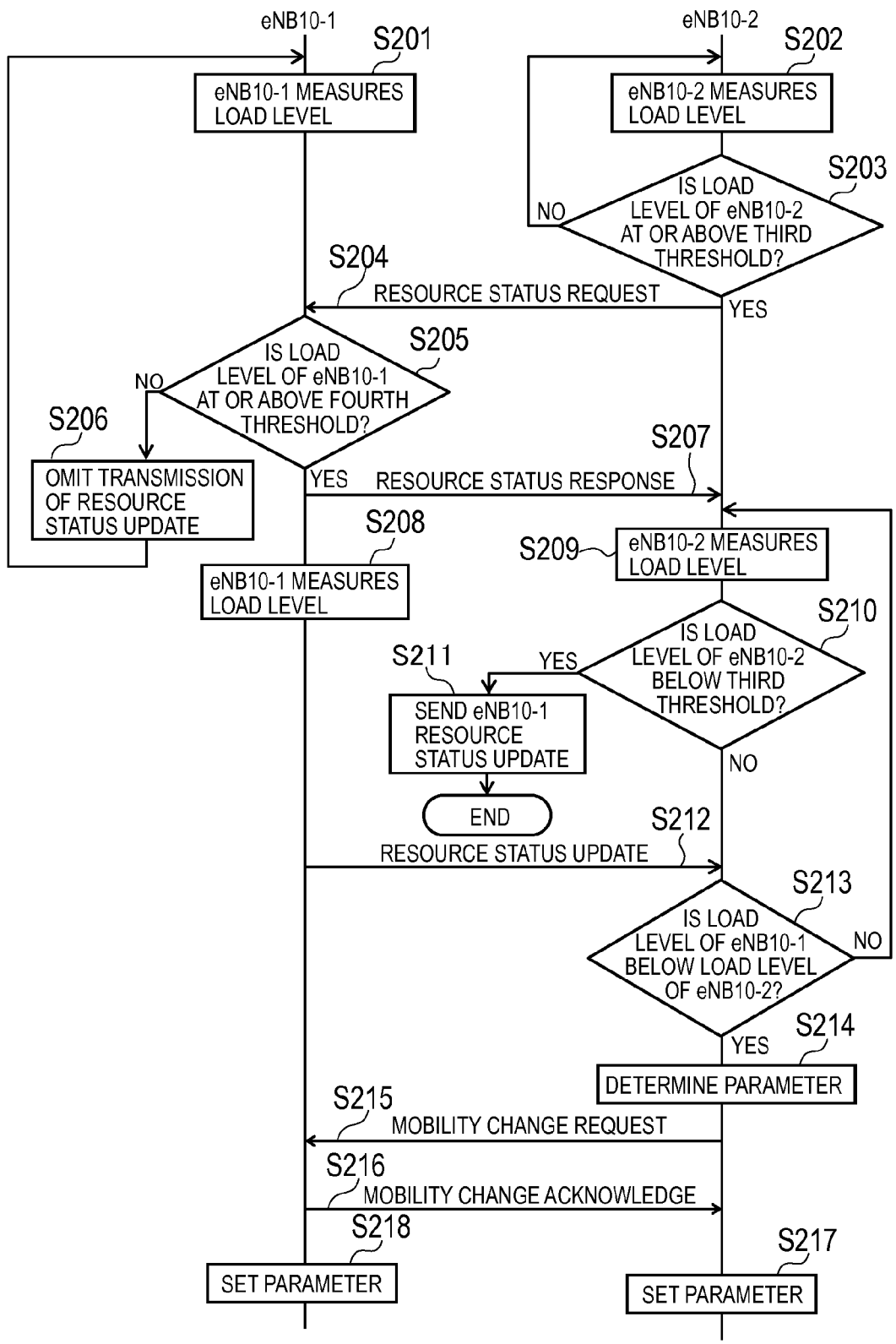
FIG. 7 is an operation sequence diagram showing second operations of the radio communication system according to the embodiment of the present invention.

FIG. 7 is an operation sequence diagram showing second operations of the radio communication system 1 according to the present embodiment.

In Step S201, the load level comparison unit 121 of the radio base station eNB10-1 measures the load level of the radio base station eNB10-1.

In Step S202, the load level comparison unit 221 of the radio base station eNB10-2 measures the load level of the radio base station eNB10-2. In Step S203, the load level comparison unit 221 of the radio base station eNB10-2 determines whether the load level of the radio base station eNB10-2 is at or above the third threshold or not.

When the load level of the radio base station eNB10-2 is below the third threshold, the operations after Step S202 are repeated.

On the other hand, when the load level of the radio base station eNB10-2 is at or above the third threshold, in Step S204, the transmission control unit 222 of the radio base station eNB10-2 controls the X2 interface communication unit 240, and the X2 interface communication unit 240 sends the radio base station eNB10-1 a Resource Status Request message requesting to start transmission of the first load information. The X2 interface communication unit 140 of the radio base station eNB10-1 receives the Resource Status Request message requesting to start transmission of the first load information.

In Step S205, the load level comparison unit 121 of the radio base station eNB10-1 determines whether the load level of the radio base station eNB10-1 is below the fourth threshold or not.

When the load level of the radio base station eNB10-1 is at or above the fourth threshold, in Step S206, the transmission control unit 122 of the radio base station eNB10-1 controls the X2 interface communication unit 140, and controlled by the transmission control unit 122, the X2 interface communication unit 140 omits (stops) transmission of a Resource Status Response message.

On the other hand, when the load level of the radio base station eNB10-1 is below the fourth threshold, in Step S207, the transmission control unit 222 of the radio base station eNB10-2 controls the X2 interface communication unit 240, and the interface communication unit 240 sends the radio base station eNB10-1 a Resource Status Response message. The X2 interface communication unit 140 of the radio base station eNB10-1 receives the Resource Status Response message.

In Step S208, the load level comparison unit 121 of the radio base station eNB10-1 measures the load level of the radio base station eNB10-1. Meanwhile, in Step S209, the load level comparison unit 221 of the radio base station eNB10-2 measures the load level of the radio base station eNB10-2.

In Step S210, the load level comparison unit 221 of the radio base station eNB10-2 determines whether the load level of the radio base station eNB10-2 is below the third threshold or not. When the load level of the radio base station eNB10-2 is below the third threshold, in Step S211, the transmission control unit 222 of the radio base station eNB10-2 controls the X2 interface communication unit 240, and the interface communication unit 240 sends the radio base station eNB10-1 a Resource Status Request message requesting to stop transmission of the first load information. The X2 interface communication unit 140 of the radio base station eNB10-1 receives the Resource Status Request message. In response to the Resource Status Request message thus received, the radio base station eNB10-1 stops transmission of the first load information.

On the other hand, when the load level of the radio base station eNB10-2 is at or above the third threshold, next in Step S212, the transmission control unit 122 of the radio base station eNB10-1 controls the X2 interface communication unit 140, and the X2 interface communication unit 140 sends the radio base station eNB10-2 a Resource Status Update message containing the first load information. The X2 interface communication unit 240 of the radio base station eNB10-2 receives the Resource Status Update message containing the first load information.

In Step S213, the load level comparison unit 221 of the radio base station eNB10-2 determines whether the load level of the radio base station eNB10-1 indicated by the first load information is below the load level of the radio base station eNB10-2 or not. When the load level of the radio base station eNB10-1 is equal to or above the radio base station eNB10-2, the operations after Step S209 are repeated.

On the other hand, when the load level of the radio base station eNB10-1 is below the load level of the radio base station eNB10-2, in Step S214, the coverage adjustment control unit 223 of the radio base station eNB10-2 determines an offset value as a handover parameter, which is to be added to RSRP 1.

In Step S215, the transmission control unit 222 of the radio base station eNB10-2 controls the X2 interface communication unit 240, and the X2 interface communication unit 240 sends the radio base station eNB10-1 a Mobility Change Request message containing the offset value. The X2 interface communication unit 140 of the radio base station eNB10-1 receives the Mobility Change Request message containing the offset value.

In Step S216, the transmission control unit 122 of the radio base station eNB10-1 controls the X2 interface communication unit 140, and the X2 interface communication unit 140 sends the radio base station eNB10-2 a Mobility Change Acknowledge message. The X2 interface communication unit 240 of the radio base station eNB10-2 receives the Mobility Change Acknowledge message.

In Step S217, the coverage adjustment control unit 123 of the radio base station eNB10-1 sets the offset value as a handover parameter. In Step S218, the coverage adjustment control unit 223 of the radio base station eNB10-2 sets the offset value as a handover parameter, which is included in the Mobility Change Request message.

(6) Advantageous Effects

As described thus far, according to the present embodiment, the radio base station eNB10-1 sends the radio base station eNB10-2 a Resource Status Update message containing the first load information when its load level is below the first threshold, and omits transmission of the Resource Status Update message containing the first load information when its load level is at or above the first threshold. The radio base station eNB10-2 needs the first load information of the radio base station eNB10-1 when reducing its coverage. However, it is difficult to expand the coverage of the radio base station eNB10-1 when the load level of the radio base station eNB10-1 is high. Accordingly, transmission of the first load information from the radio base station eNB10-1 to the radio base station eNB10-2 is unnecessary in view of the difficulty in expanding the coverage of the radio base station eNB10-1. For this reason, in such a case, transmission of the first load information is omitted to reduce the load on the X2 interface between the radio base station eNB10-1 and the radio base station eNB10-2.

Further, according to the present embodiment, the radio base station eNB10-1 stops transmission of a Resource Status Update message containing the first load information when its load level is at or above the second threshold after the transmission of the Resource Status Update message containing the first load information. As described above, when it is difficult to expand the coverage of the radio base station eNB10-1 because of the high load level of the radio base station eNB10-1, transmission of the first load information from the radio base station eNB10-1 to the radio base station eNB10-2 is unnecessary in view of the difficulty in expanding the coverage of the radio base station eNB10-1. Accordingly, transmission of the Resource Status Update message containing the first load information is stopped when the load level of the radio base station eNB10-1 is at or above the second threshold. Thereby, the load on the X2 interface between the radio base station eNB10-1 and the radio base station eNB10-2 can be reduced.

Moreover, according to the present embodiment, upon receipt of a request from the radio base station eNB10-2 for the first load information, the radio base station eNB10-1 sends the radio base station eNB10-2 a Resource Status Response message as a response when the load level of the radio base station eNB10-1 is below the fourth threshold, and omits transmission of the Resource Status Response message when the load level of the radio base station eNB10-1 is at or above the fourth threshold. The radio base station eNB10-2 needs the first load information of the radio base station eNB10-1 when reducing its coverage. However, it is difficult to expand the coverage of the radio base station eNB10-1 when the load level of the radio base station eNB10-1 is high. Accordingly, transmission of the Resource Status Response message from the radio base station eNB10-1 to the radio base station eNB10-2 is unnecessary in view of the difficulty in expanding the coverage of the radio base station eNB10-1. For this reason, in such a case, transmission of the Resource Status Response message is omitted to reduce the load on the X2 interface between the radio base station eNB10-1 and the radio base station eNB10-2.

(7) Other Embodiments

As described above, the present invention has been described by using the embodiment of the present invention. However, it should not be understood that the description and drawings which constitute part of this disclosure limit the present invention. From this disclosure, various alternative embodiments, examples, and operation techniques will be easily found by those skilled in the art.

Although the radio base station eNB10-2 sets an offset value to be added to RSRP 1 in the embodiment described above, the radio base station eNB10-2 may set an offset value to be subtracted from RSRP 2. Alternatively, the radio base station eNB10-2 may set both an offset value to be added to RSRP 1 and an offset value to be subtracted from RSRP 2.

Although there is only one radio base station eNB10-1 in the above-described embodiment, there may be multiple radio base stations eNB10-1. In this case, the transmission control unit 222 of the radio base station eNB10-2 may perform control such that the Resource Status Request message requesting to start transmission of the first load information is sent only to a certain one of the multiple radio base stations eNB10-1. For example, the transmission control unit 222 acquires propagation loss (pass loss) between the radio base station eNB10-2 and each of the radio base stations eNB10-1, and performs control so that the Resource Status Request message is not sent to the radio base station eNB10-1 having a pass loss below a predetermined value. In this case, what is avoided is unnecessary transmission of the Resource Status Request message to a radio base station eNB10-1 which is located far away from the radio base station eNB10-2 and therefore has a low possibility to reduce the load on the radio base station eNB10-2. As a result, the load on the X2 interface is reduced.

Further, upon receipt of the first load information from each of the radio base stations eNB10-1, the load level comparison unit 221 of the radio base station eNB10-2 may calculate the mean value of load levels which are indicated by the respective first load information, and determine whether the load on the radio base station eNB10-2 is below the mean value or not.

Although the load information is included in a Resource Status Update message in the above-described embodiment, the load information may be included in the Resource Status Response message which is a response to a load information request.

Although the radio communication system 1 is configured of the radio base station eNB10-1 and the radio base station eNB10-2 in the above-described embodiment, the present invention is similarly applicable to a radio communication system configured of a macro-cell base station MeNB and a pico-cell base station PeNB.

Figure 8:
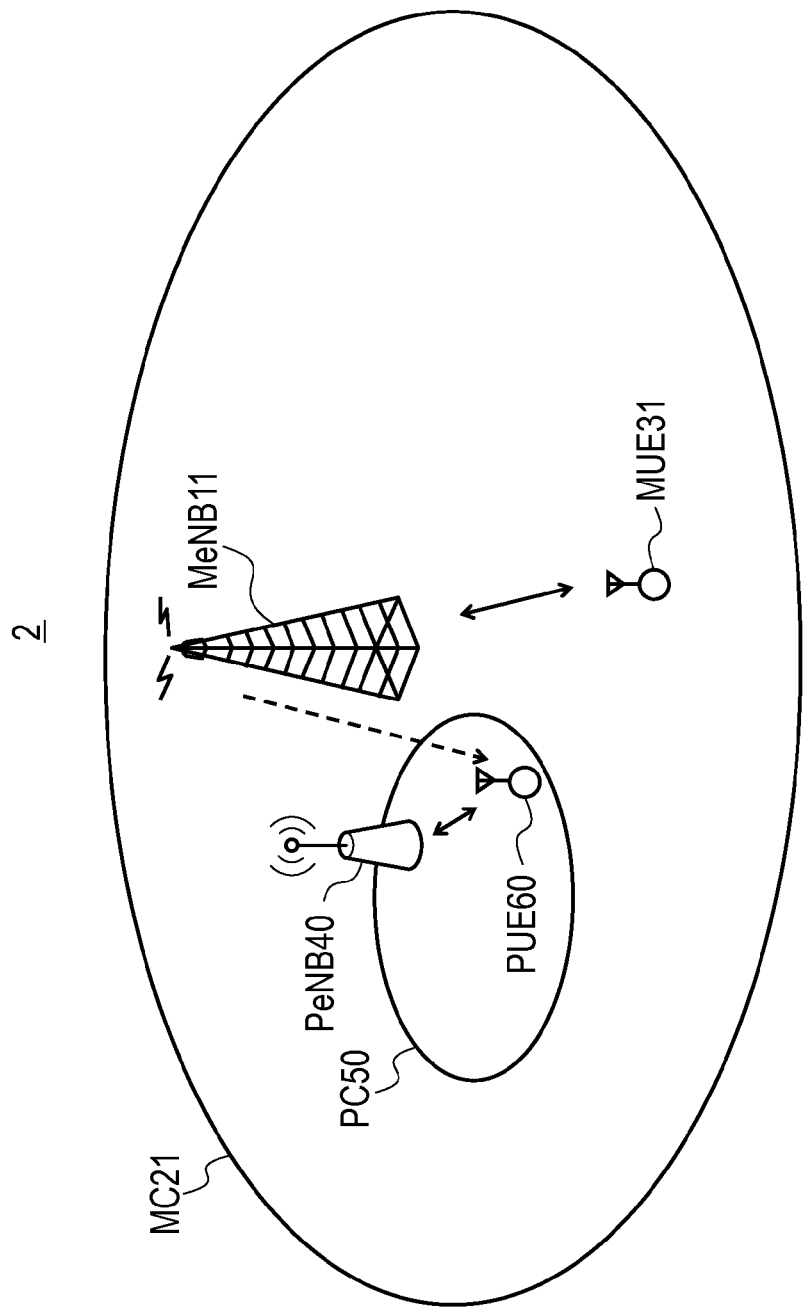
FIG. 8 is a diagram showing the schematic configuration of a radio communication system according to another embodiment.

FIG. 8 is a diagram of the schematic configuration of a radio communication system 2 according to another embodiment. As shown in FIG. 7, in the radio communication system 2, the radio base stations have heterogeneous-network arrangement. The radio communication system 2 has a macro-cell base station MeNB11, a radio terminal MUE31 connected to the macro-cell base station MeNB11, a pico-cell base station PeNB40 which is arranged in a macro cell MC21 formed by the macro-cell base station MeNB11 and is adjacent to the macro-cell base station MeNB11, and a radio terminal PUE60 connected to the pico-cell base station PeNB40 inside a pico cell PC50 formed by the pico-cell base station PeNB40. The macro-cell base station MeNB11 and the pico-cell base station PeNB40 can perform inter-station communication using an X2 interface.

In the radio communication system 2 shown in FIG. 7, the macro-cell base station MeNB11 performs processing similar to that performed by the radio base station eNB10-1 in FIG. 1, and the pico-cell base station PeNB40 performs processing similar to that performed by the radio base station eNB10-2 in FIG. 1. Alternatively, the pico-cell base station PeNB40 performs processing similar to that performed by the radio base station eNB10-1 in FIG. 1, and the macro-cell base station MeNB11 performs processing similar to that performed by the radio base station eNB10-2 in FIG. 1.

In LTE Advanced, a relay node which is a radio base station configuring a wireless backhaul is expected to be employed, and the X2 interface is to be employed for the relay node as well. Accordingly, the relay node can be the second radio base station according to the present invention.

Although the backhaul is an X2 interface in the above-described embodiment, the present invention is similarly applicable to a case where the backhaul is an S1 interface, or a case where the backhaul is an X2 interface and an S1 interface. When the backhaul is an S1 interface, each radio base station eNB has an S1 interface communication unit.

Further, the present invention is applied to the LTE system in the embodiment described above, but may be applied to other radio communication systems such as a radio communication system based on WiMAX (IEEE 802.16).

As described above, it should be understood that the present invention includes various embodiments and the like which are not described herein.

This application claims the benefit of priority from Japanese Patent Application No. 2010-122142 (filed on May 27, 2010), the entire contents of which are incorporated herein by reference.

INDUSTRIAL APPLICABILITY

As described, the radio communication system, the radio base station, and the communication control method according to the present invention can reduce the load on the transmission path between the radio base stations, and therefore are useful in radio communication such as mobile communication.

The invention claimed is:

1. A radio communication system comprising a first radio base station and a second radio base station which are each capable of adjusting its coverage according to load on the radio base station itself and load on the other radio base station, wherein
the first radio base station comprises:
a load information transmission unit configured to transmit, to the second radio base station, load information indicating a load level of the first radio base station; and
a controller configured to control the load information transmission unit,
when the load level of the first radio base station is below a first threshold, the controller controls the load information transmission unit so that the load information is transmitted to the second radio base station,
when the load level of the first radio base station is at or above the first threshold, the controller controls the load information transmission unit so that transmission of the load information to the second radio base station is omitted, and
the second radio base station comprises a load information reception unit configured to receive the load information from the first radio base station.

2. A radio communication system comprising a first radio base station and a second radio base station which are each capable of adjusting its coverage according to load on the radio base station itself and load on the other radio base station, wherein
the second radio base station comprises a load request information transmission unit configured to transmit load request information requesting load information indicating a load level of the first radio base station,
the first radio base station comprises:
a load request information reception unit configured to receive the load request information from the second radio base station;
a response information transmission unit configured to transmit, to the other radio base station, response information as a response to the load request information; and
a controller configured to control the transmission unit,
when the load level of the first radio base station is below a first threshold, the controller controls the load information transmission unit so that the response information is transmitted to the second radio base station, and
when the load level of the first radio base station is at or above the first threshold, the controller controls the load information transmission unit so that transmission of the response information to the second radio base station is omitted.

3. A radio base station capable of adjusting its coverage according to load on the radio base station and load on a different radio base station, comprising:
- a transmission unit configured to transmit, to the different radio base station, load information indicating a load level of the radio base station; and
- a controller configured to control the transmission unit, wherein
- when the load level of the radio base station is below a first threshold, the controller controls the transmission unit so that the load information is transmitted to the different radio base station, and
- when the load level of the radio base station is at or above the first threshold, the controller controls the transmission unit so that transmission of the load information to the different radio base station is omitted.

4. A radio base station capable of adjusting its coverage according to load on the radio base station and load on a different radio base station, comprising:
- a reception unit configured to receive load request information requesting load information indicating a load level of the radio base station, the load request information being transmitted from the different radio base station;
- a transmission unit configured to transmit, to the different radio base station, response information as a response to the load request information; and
- a controller configured to control the transmission unit, wherein
- when the load level of the radio base station is below a first threshold, the controller controls the transmission unit so that the response information is transmitted to the different radio base station, and
- when the load level of the radio base station is at or above the first threshold, the controller controls the transmission unit so that transmission of the response information to the different radio base station is omitted.

5. The radio base station according to claim 3, wherein
- when the load level of the radio base station reaches or exceeds a second threshold after the transmission of the load information, the transmission controller controls the transmission unit so that the transmission of the load information is stopped.

6. The radio base station according to claim 5, wherein
- the second threshold is a value of a load level at which the radio base station is capable of operating stably.

7. A communication control method for a radio base station capable of adjusting its coverage according to load on the radio base station and load on a different radio base station, comprising the steps of:
- transmitting, to the different radio base station, load information indicating a load level of the radio base station; and
- controlling transmission of the load information, wherein
- in the step of controlling transmission of the load information,
- when the load level of the radio base station is below a first threshold, control is performed so that the load information is transmitted to the different radio base station, and
- when the load level of the radio base station is at or above the first threshold, control is performed so that transmission of the load information to the different radio base station is omitted.

8. A communication control method for a radio base station capable of adjusting its coverage according to load on the radio base station and load on a different radio base station, comprising the steps of:
- receiving load request information transmitted from the different radio base station, the load request information requesting load information indicating a load level of the radio base station;
- transmitting, to the different radio base station, response information as a response to the load request information; and
- controlling transmission of the response information, wherein
- in the step of controlling transmission of the response information,
- when the load level of the radio base station is below a first threshold, control is performed so that the response information is transmitted to the different radio base station, and
- when the load level of the radio base station is at or above the first threshold, control is performed so that transmission of the response information to the different radio base station is omitted.

* * * * *